(12) United States Patent
Herla

(10) Patent No.: US 7,318,692 B2
(45) Date of Patent: Jan. 15, 2008

(54) SPINDLE FOR A MACHINE TOOL WITH IMPROVED TOOL EJECTION FEATURE

(75) Inventor: Max Herla, Röthlein (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/820,441

(22) Filed: Apr. 8, 2004

(65) Prior Publication Data

US 2004/0228697 A1    Nov. 18, 2004

(30) Foreign Application Priority Data

Apr. 9, 2003    (DE) .................................. 103 16 244

(51) Int. Cl.
*B23C 1/00*    (2006.01)
(52) U.S. Cl. .................. 409/233; 409/131; 279/155
(58) Field of Classification Search ............ 409/131, 409/231–233; 279/155
See application file for complete search history.

(56) References Cited

U.S. PATENT DOCUMENTS

| | | | | |
|---|---|---|---|---|
| 2,343,875 A * | 3/1944 | Schwartz | ..................... | 409/135 |
| 2,995,069 A * | 8/1961 | Wahlstrom | ................... | 409/233 |
| 3,806,272 A * | 4/1974 | Muller | ................... | 408/239 R |
| 4,409,721 A * | 10/1983 | Tomita et al. | ................... | 483/7 |
| 4,414,732 A * | 11/1983 | Tomita et al. | ................... | 483/7 |
| 4,583,894 A * | 4/1986 | Mitchell | ..................... | 409/233 |
| 4,944,638 A * | 7/1990 | Brohammer | ................... | 408/59 |
| 5,009,554 A * | 4/1991 | Kameyama et al. | ........ | 409/231 |
| 5,033,922 A | 7/1991 | Watanabe et al. | | |
| 5,322,494 A * | 6/1994 | Holtey et al. | .................. | 483/12 |
| 5,676,506 A * | 10/1997 | Sugata | ........................ | 409/136 |
| 5,823,722 A * | 10/1998 | Takenaka | ..................... | 409/230 |
| 5,860,776 A * | 1/1999 | Sato et al. | ................... | 409/233 |
| 6,234,731 B1 * | 5/2001 | Sakamoto | .................... | 409/144 |
| 6,264,409 B1 * | 7/2001 | Date et al. | ................... | 409/233 |
| 6,464,435 B1 * | 10/2002 | Chen | .......................... | 409/231 |
| 6,840,896 B2 * | 1/2005 | Endo et al. | .................... | 483/30 |
| 2001/0048858 A1* | 12/2001 | Akamatsu et al. | .......... | 409/134 |
| 2004/0208720 A1* | 10/2004 | Wehrfritz | ..................... | 409/231 |

FOREIGN PATENT DOCUMENTS

| | | | |
|---|---|---|---|
| DE | 36 29 453 | | 3/1988 |
| DE | 199 37 447 | | 2/2001 |
| DE | 101 23 717.0 | * | 6/2002 |
| DE | 101 01 095 A | | 7/2002 |

* cited by examiner

*Primary Examiner*—Monica Carter
*Assistant Examiner*—Eric A. Gates
(74) *Attorney, Agent, or Firm*—Henry M. Feiereisen; Ursula B. Day

(57) ABSTRACT

A spindle unit for a machine tool includes a drive unit having a drive shaft and a spindle head assembly constructed for receiving a tool and having a hollow spindle head shaft driven by the drive unit. Arranged for axial displacement in the hollow spindle head shaft is a tie rod which is mechanically coupled with the drive shaft so as to transmit an axial movement of the drive shaft to the tie rod.

11 Claims, 3 Drawing Sheets

SPINDLE FOR A MACHINE TOOL WITH IMPROVED TOOL EJECTION FEATURE

CROSS-REFERENCES TO RELATED APPLICATIONS

This application claims the priority of German Patent Application, Serial No. 103 16 244.5, filed Apr. 9, 2003, pursuant to 35 U.S.C. 119(a)-(d), the disclosure of which is incorporated herein by reference.

BACKGROUND OF THE INVENTION

The present invention relates to a spindle unit for machine tools that facilitates an automatic tool change, as well as to a corresponding method for operating such spindle unit.

Motor-driven milling spindles typically include a shaft with a shrink-fit rotor arranged between two bearings assemblies. A tool tensioning system consisting of a chucking head, tie rod and typically a disk spring arrangement is arranged in the interior of the shaft. Frequently, a tensioning system sensor located on the tie rod and a tool loosening rod are typically attached to the end of the spindle unit. Optionally, a rotary feedthrough that is supported in roller bearings can be coupled by way of a connecting piece.

This type of spindle with a tool chuck is disclosed in the German patent publication DE 199 37 447. A tie rod that can rotate and axially move with the spindle is arranged in the spindle for clamping and/or loosening the tool chuck. At least one contactless operating sensor is provided for measuring the positions of the tool chuck. A sensor that measures continues the displacement of the tie rod is provided to better control clamping of the tool.

The German patent publication DE 36 29 453 describes an electromechanical device for generating an axial force for operating collets. An electric motor moves a hollow tie rod via a spur gear and a spindle drive in an axial direction. To reduce the friction forces caused by operating in a relatively small installation space, the rotor is connected with a pinion which engages with a toothed gear that is secured on an spindle that is supported in a housing and is prevented from moving in an axial direction. A spindle nut, which is connected to the tie rod that is supported in the housing for axial movement relative to the housing, is arranged on the spindle. Consequently, a separate electric motor has to be used for moving the tie rod.

It may sometimes be desirable to separate an entire spindle unit into a drive unit and a coupled anterior spindle, for example for exchanging or automatically changing the anterior spindle, for being able to use larger or smaller tools, or for intermediately connecting a two-stage planetary drive to increase the torque.

With conventional spindles, the tie rod, which has to remain in the anterior spindle, disadvantageously has to extend through the coupling and the motor shaft so as to reach the tool changing assembly and the tie rod sensor located behind the motor. This can not only result in a complex configuration due to the limited space reasons, but can also cause dynamical problems associated with oscillations. Moreover, when the anterior spindle is changed, the area behind the drive motor would need to be accessed when mounting/exchanging a tool, which would negate any advantages achieved by separating these components.

It would therefore be desirable and advantageous to provide an improved spindle arrangement for machine tools and a corresponding method for operating such spindle arrangement, which obviates prior art shortcomings and is able to specifically facilitate automatic tool changes.

SUMMARY OF THE INVENTION

According to one aspect of the present invention, a spindle unit for a machine tool includes a drive unit having a drive shaft, a spindle head assembly constructed for receiving a tool and having a hollow spindle head shaft driven by the drive unit, a tie rod arranged for axial displacement in the hollow spindle head shaft and mechanically coupled with the drive shaft, and a shifting unit for axially moving the drive shaft together with the tie rod.

According to another aspect of the invention, a method for operating a spindle unit for a machine tool of a type having a drive unit with a drive shaft and a spindle head assembly for receiving a tool with a tie rod, includes the steps of shifting the tie rod in axial direction to a first position with the help of the drive shaft, and moving the drive shaft backwards in axial direction to a second position, thereby also enabling a backward movement by the tie rod.

According to another feature of the present invention, the spindle head assembly and the drive unit can be detachably connected to one another. As a consequence, also the drive shaft and the tie rod can be detachably connected.

According to another feature of the present invention, the spindle head shaft may have one end facing the drive shaft and may be constructed as a spline shaft, with the drive shaft having an end face constructed as a hollow wheel to complement the one end of the spindle head shaft and to enable coupling therewith, or vice versa.

If the spindle head is arranged removable from the drive unit, then the drive shaft can have a central bore for transporting a material, and a removable tube of the tie rod can extend into the central bore. Alternatively, the tie rod can have a central bore for transporting a material, and a removable tube of the drive shaft can extend into the central bore. This arrangement can be used, for example, to feed a lubricant through the drive shaft to the tool.

The drive shaft can be formed in one piece with the tie rod. The tie rod and the spindle head shaft can then have mating interlocking teeth or wedges for transferring the torque from the drive shaft to the spindle head shaft.

The drive unit can also include an electric motor with a rotor mounted on the drive shaft. Because the drive shaft is moveable, the dimensions of the stator of the electric motor should be selected so as to completely surround the rotor independent of the displacement of the shifting unit. The electric motor can then operate with maximum efficiency at any displacement position.

According to another feature of the present invention, the spindle unit may include an axially displaceable bearing assembly, for example, bearing sleeves, for support of the drive shaft. The present invention is based on the premise to configure the bearings sleeves of the drive motor to be movable between two stops, for example by a hydraulic mechanism, because the bearings sleeves are typically hydraulically pretensioned in the axial direction to compensate for thermal effects. The drive shaft can also be moved hydraulically because, as described above, a hydraulic unit is frequently already installed for the purpose of pretensioning the bearing sleeves. Other mechanisms, such as pneumatic and/or electromechanical mechanisms, can also be used to move the drive shaft. During the operation, the tie rod can be moved so as to contact the drive shaft. A sensing device can be added for measuring an axial position of the drive shaft and to thereby indirectly measure also the axial position of the tie rod. This has the advantage that the position of the tie rod is known when the position of the drive shaft is known.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application Ser. No. 10/820,445, is hereby expressly incorporated by reference: "SPINDLE UNIT WITH SWITCHABLE GEAR, AND METHOD FOR USING THE SPINDLE UNIT".

Figure 1:
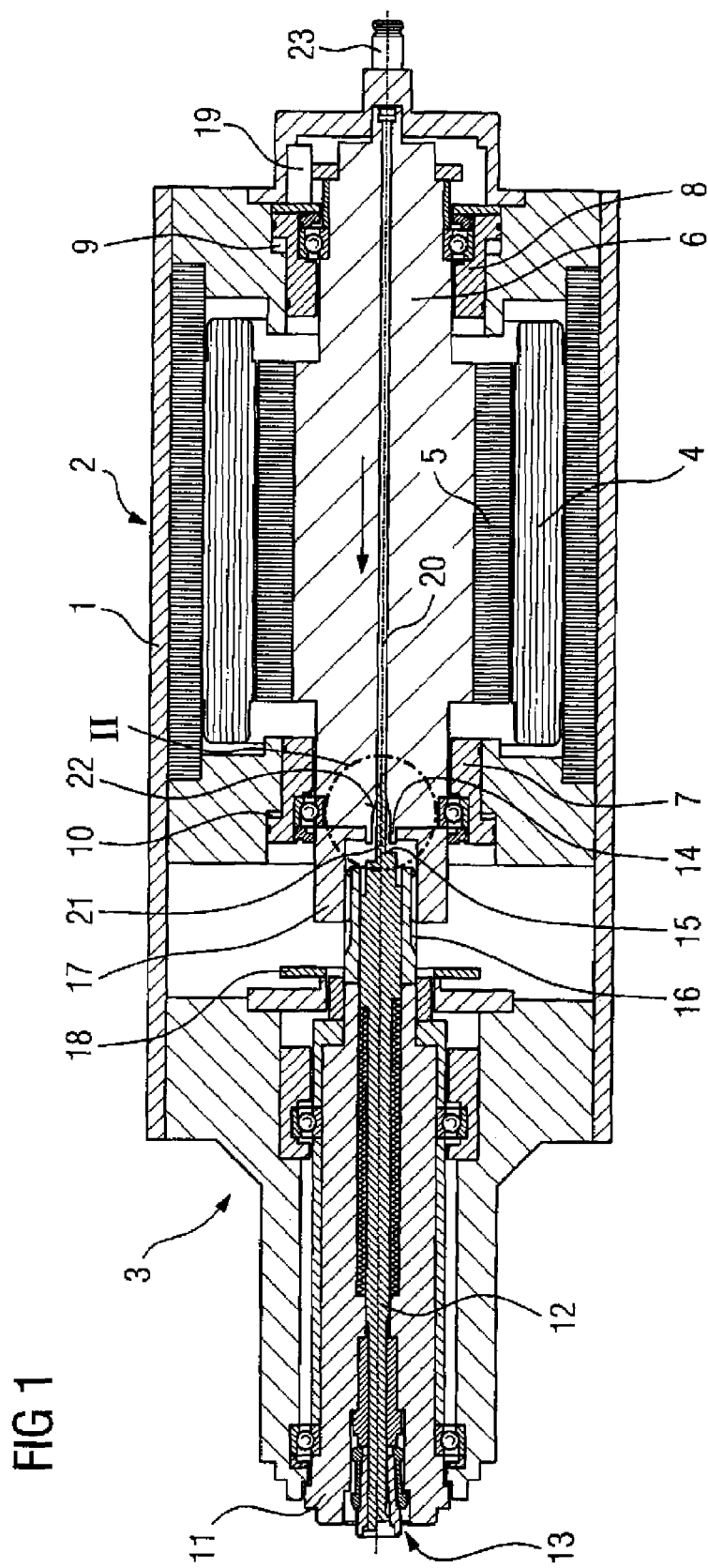
FIG. 1 shows a cross-sectional view of a motor-driven milling spindle according to the present invention.

Turning now to FIG. 1, there is shown a cross-sectional view of a separable motor-driven milling spindle according to the present invention including a housing 1 for accommodation of a drive unit 2 and a spindle head assembly or anterior spindle 3. The drive unit 2 basically includes an electric motor with a stator 4 and a rotor 5 which is shrink-fit on a drive shaft 6. The drive shaft 6 is supported on both ends by bearing sleeves 7, 8. The bearing sleeves 7, 8 can be moved in the axial direction with a hydraulic system (not shown). In the example depicted in FIG. 1, a piston space 9 is pressurized, allowing the bearing sleeve 8 with the drive shaft and the bearing sleeve 7 to move in a direction away from the anterior spindle 3. A second piston space 10 is provided on the bearing sleeve 7 that faces the anterior spindle. When the second piston space 10 is pressurized, the bearing sleeve 7 with the drive shaft 6 and the bearing sleeve 8 move toward the anterior spindle 3.

The anterior spindle 3 basically includes a spindle head shaft 11 and a tie rod 12 capable of actuating a collet 13 for clamping tools. The tie rod 12 and the collet 13 are shown in FIG. 1 and on an enlarged scale in FIG. 1 in two different positions. In the upper section of FIGS. 1 and 2, the tie rod 12 and the collet 13 are in a forward position adapted to eject a tool. In the lower section of FIGS. 1 and 2, the tie rod 12 and the collet 13 are in a retracted position, in which the tool is clamped. The axial pressure of the drive shaft 6 is provided via a tubular extension 14 of the drive shaft that presses against a corresponding shoulder 15 of the tie rod 12.

Torque is transferred from the drive shaft 6 to the spindle head shaft 11 via a coupling that includes a spline-shaped end 16 of the spindle head shaft 11 and a mating hollow wheel 17 which is non-rotatably connected with the drive shaft 6. The hollow wheel 17 is axially movably and engages non-rotatably with the spline-shaped end 16.

A position sensor 18 is provided to measure the axial position of the tie rod 12 and to transmit a corresponding position signal to a control circuit (not shown) of the motor-driven milling spindle.

A rotary encoder 19 that is axially moveable with a shaft 6 is arranged on the end of the drive shaft 6 that faces away from the anterior spindle 3. The rotary encoder 19 measures the rotation speed and rotation position, respectively, of the drive shaft 6. Because the drive shaft 6 is non-rotatably coupled to the spindle head shaft 11, the rotation speed and rotation position, respectively, of the spindle head shaft 11 can likewise be measured.

The drive shaft 6 has a central bore 20 through which lubricants can be supplied to the tool. Since the spindle head 3 is configured to be removable from the drive unit 2, the tie rod 12 has a tubular extension 21 that faces the drive unit 2 and extends into the bore 20. The tie rod 12 also has a bore for supplying the lubricant. This bore is only partially indicated in FIG. 1. To facilitate insertion of the tubular extension 21 into the bore 20, the drive shaft 6 has a funnel-shaped receptacle 22 on the side facing the tie rod.

The force required to eject a tool is produced by the pretensioning pressure of the bearing sleeves via the bearings. The ejection forces are typically small enough so as not to damage the bearings. The length of the coupling located between the drive shaft 6 and the spindle head shaft 11, including the spline-shaped end 16 of the spindle head shaft 11 and a hollow wheel 17, has to allow a sufficiently long stroke for ejecting the tool. The various pressures of the hydraulic system are adjusted so that the drive shaft 6 remains in contact with the tie rod 12 in the axial direction during operation of the spindle unit. Because the drive shaft 6 can be regarded as an extension of the tie rod, its position can also be measured. Alternatively, is indicated above, the drive shaft 6 can also be formed as one piece with the tie rod 12, so that the position of the tie rod can also be inferred from the position of the drive shaft.

The lubricant is introduced into the drive shaft through a rotary feed 23 disposed on an end of the drive shaft 6 that faces away from the anterior spindle 3. The rotary feed 23 does not have to be separately supported since it is mounted on the drive shaft 6 and is hence supported by the drive shaft 6.

This design permits a tool change while the spindle unit is rotating, because unlike with conventional spindles, there is no need for a rod to exert pressure on to the stationery tie rod. Accordingly, there is also no need for a safety device that would force the spindle to a stop during a tool change.

Figure 2:
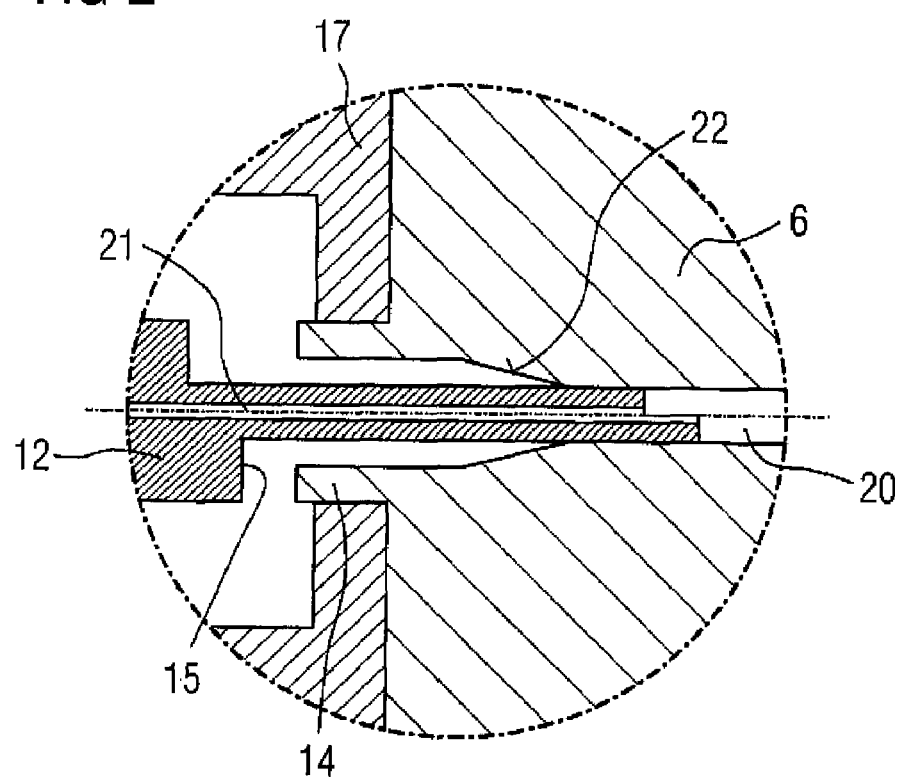
FIG. 2 is an enlarged detailed view of the area encircled in FIG. 1 and marked II.
Figure 3:
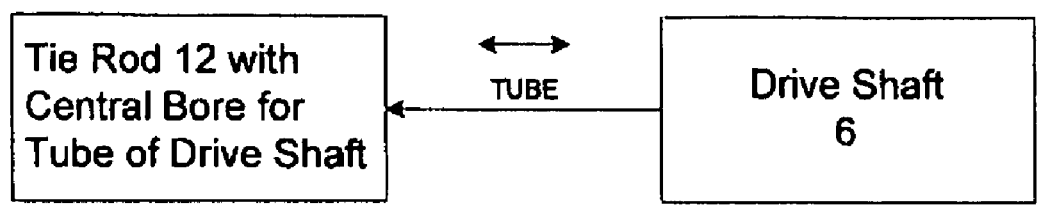
FIG. 3 is a block diagram of a variation of a motor-driven milling spindle according to the present invention.

FIG. 3 shows a block diagram of a modification of a separable motor-driven milling spindle. Parts corresponding with those in FIGS. 1 and 2 are denoted by identical reference numerals and not explained again. The description below will center on the differences between the embodiments. In this embodiment, the tie rod 12 has a central bore for transporting a material, with the drive shaft 6 having a tube extending into the central bore and being removable therefrom.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A spindle unit for a machine tool, comprising:
a drive unit having a drive shaft and a rotor which is mounted in fixed rotative engagement to the drive shaft;
a spindle head assembly having a hollow spindle head shaft driven by the drive unit;
a tie rod arranged for axial displacement in the hollow spindle head shaft between rearward and forward positions and detachably coupled with the drive shaft;
a collet placed in a pocket of the spindle head shaft and interacting with the tie rod to clamp a tool, when the tie rod assumes the rearward position, and to expel the tool, when the tie rod assumes the forward position;
a bearing assembly supporting the drive shaft; and
a shifting unit for moving the bearing assembly in axial direction to thereby displace the drive shaft together with the rotor and the tie rod between the rearward and forward positions,
wherein the spindle head assembly and the drive unit are positioned in axially successive relationship and detachably connected to one another to allow an exchange of the tool, while the drive unit rotates.

2. The spindle unit of claim 1, wherein the spindle head shaft has one end facing the drive shaft and constructed as a spline shaft, said drive shaft having an end face constructed as a hollow wheel to complement the one end of the spindle head shaft and to enable coupling therewith.

3. The spindle unit of claim 1, wherein the drive shaft has a central bore for transporting a material, said tie rod having a tube extending into the central bore and being removable therefrom.

4. The spindle unit of claim 1, wherein the tie rod has a central bore for transporting lubricant, said drive shaft having a tube extending into the central bore and being removable therefrom.

5. The spindle unit of claim 1, wherein the drive shaft is constructed in one piece with the tie rod.

6. The spindle unit of claim 1, wherein the drive unit includes an electric motor having a rotor mounted on the drive shaft for conjoint displacement with the drive shaft.

7. The spindle unit of claim 6, wherein the electric motor includes a stator which completely surrounds the rotor independent of a displacement position of the shifting unit.

8. The spindle unit of claim 1, wherein the drive shaft has opposite ends, said bearing assembly having a bearing sleeve for support of one end of the drive shaft, and another bearing sleeve for support of the other end of the drive shaft.

9. The spindle unit of claim 1, wherein the shifting unit is constructed for operation by one of hydraulic means, pneumatic means, and electromechanical means.

10. The spindle unit of claim 1, wherein during operation of the spindle unit, the shifting unit is controlled so as to cause the drive shaft to axially contact the tie rod, and further comprising a sensing device constructed for measuring an axial position of the drive shaft and thereby implementing an indirect measurement of an axial position of the tie rod.

11. The spindle unit of claim 1, wherein the spindle head assembly is disposed in coaxial relationship to the drive unit.

* * * * *